United States Patent
Sarwari et al.

(10) Patent No.: US 9,635,273 B2
(45) Date of Patent: Apr. 25, 2017

(54) MULTI-IMAGER VIDEO CAMERA WITH FRAME-BY-FRAME VIEW SWITCHING

(71) Applicant: ALTIA SYSTEMS INC, Cupertino, CA (US)

(72) Inventors: Atif M. Sarwari, Saratoga, CA (US); Naveed Alam, Cupertino, CA (US); Khurshed Mazhar, Redmond, WA (US)

(73) Assignee: ALTIA SYSTEMS, INC., Cupertino, CA (US)

( * ) Notice: Subject to any disclaimer, the term of this patent is extended or adjusted under 35 U.S.C. 154(b) by 0 days.

(21) Appl. No.: 14/271,313

(22) Filed: May 6, 2014

(65) Prior Publication Data

US 2015/0009350 A1    Jan. 8, 2015

Related U.S. Application Data

(63) Continuation of application No. 12/887,263, filed on Sep. 21, 2010, now Pat. No. 8,754,941.

(51) Int. Cl.

| | |
|---|---|
| H04N 5/232 | (2006.01) |
| H04N 5/235 | (2006.01) |
| H04N 7/18 | (2006.01) |
| H04N 5/262 | (2006.01) |
| H04N 5/265 | (2006.01) |

(52) U.S. Cl.
CPC ....... *H04N 5/2351* (2013.01); *H04N 5/23229* (2013.01); *H04N 5/23238* (2013.01); *H04N 5/265* (2013.01); *H04N 5/2628* (2013.01); *H04N 7/18* (2013.01); *H04N 7/181* (2013.01)

(58) Field of Classification Search
CPC .............. H04N 7/181; H04N 5/23229; H04N 5/23238; H04N 5/265; H04N 7/18; H04N 5/2628

See application file for complete search history.

(56) References Cited

U.S. PATENT DOCUMENTS

| | | | |
|---|---|---|---|
| 5,715,490 | A | 2/1998 | Ishito |
| 7,520,685 | B2 | 4/2009 | Lee |
| 2003/0095183 | A1 | 5/2003 | Roberts et al. |
| 2003/0202099 | A1 | 10/2003 | Nakamura et al. |
| 2003/0206739 | A1 | 11/2003 | Lu |
| 2004/0130655 | A1 | 7/2004 | Yanakawa et al. |

(Continued)

FOREIGN PATENT DOCUMENTS

EP    2 066 114 A1    3/2009

*Primary Examiner* — Neil Mikeska

(74) *Attorney, Agent, or Firm* — HM Law Group LLP; Vani Moodley, Esq.

(57) ABSTRACT

One embodiment relates to a method of outputting multiple views from a networked camera. Each imager of an array of imagers in the camera captures image frames and transmits the captured image frames to an associated image flow processor. Each image flow processor processes the captured image frames and transmits the processed image frames to a multi-imager video processor. An updating of parameters for said processing by each image flow processor is performed on a frame-by-frame basis. Another embodiment relates to a video camera including a plurality of imagers, a plurality of image flow processors, a multi-imager video processor, and a plurality of update queues. Other embodiments and features are also disclosed.

11 Claims, 13 Drawing Sheets

(top schematic view)

(front perspective view)

(56) References Cited

U.S. PATENT DOCUMENTS

| | | |
|---|---|---|
| 2005/0012818 A1 | 1/2005 | Kiely et al. |
| 2005/0044258 A1 | 2/2005 | Nakamura |
| 2005/0140787 A1* | 6/2005 | Kaplinsky ........ G08B 13/19656 348/207.1 |
| 2005/0146610 A1* | 7/2005 | Creamer et al. ........... 348/207.1 |
| 2006/0165309 A1* | 7/2006 | Yachi et al. .................. 382/284 |
| 2006/0255986 A1* | 11/2006 | Takanezawa et al. .......... 341/67 |
| 2007/0098397 A1 | 5/2007 | Chen et al. |
| 2007/0156854 A1 | 7/2007 | Wei et al. |
| 2007/0182819 A1 | 8/2007 | Monroe |
| 2008/0056708 A1 | 3/2008 | Kim |
| 2009/0040293 A1 | 2/2009 | Foo et al. |
| 2009/0141143 A1 | 6/2009 | Alm |
| 2009/0207246 A1* | 8/2009 | Inami et al. .................. 348/135 |
| 2010/0092037 A1* | 4/2010 | Peleg ................. G06F 17/3079 382/103 |

\* cited by examiner

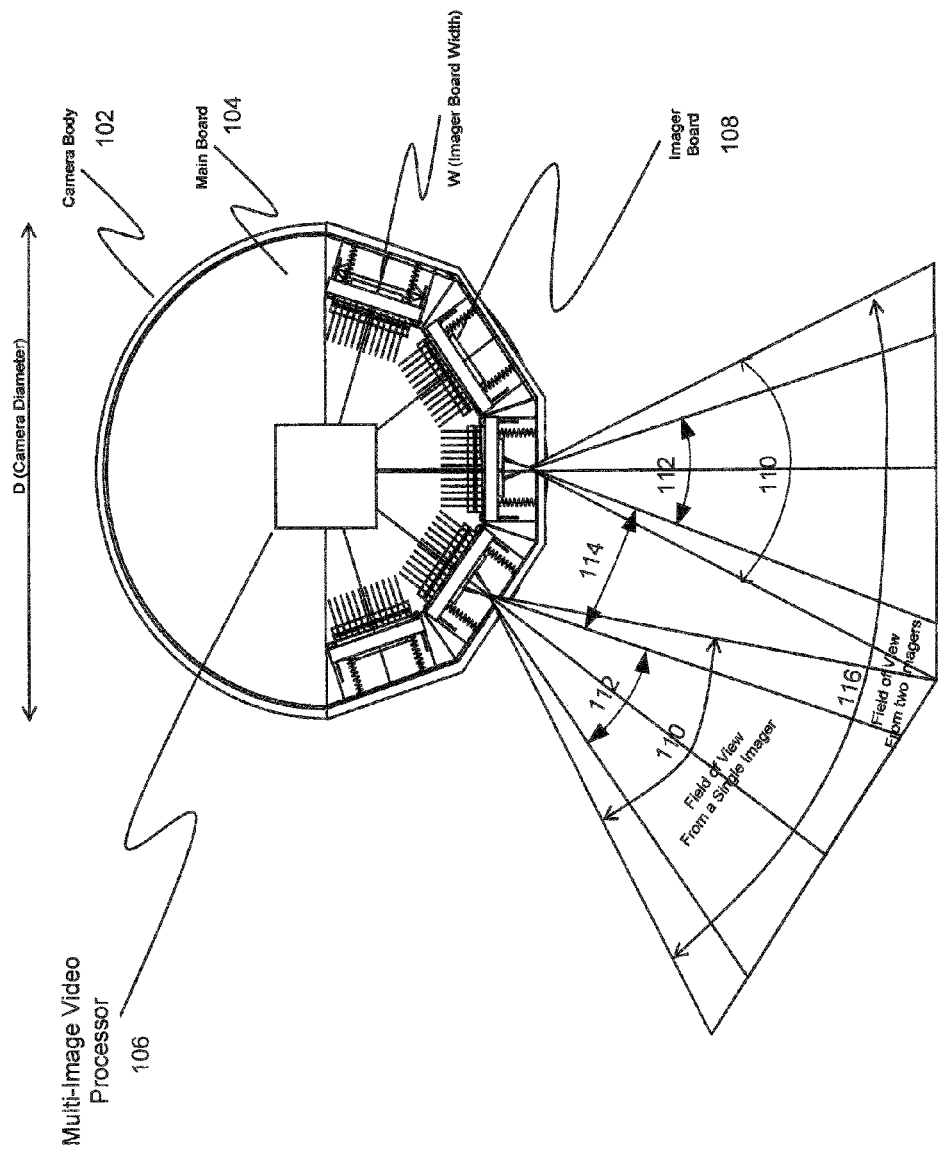

(front perspective view)

MULTI-IMAGER VIDEO CAMERA WITH FRAME-BY-FRAME VIEW SWITCHING

CROSS-REFERENCE TO RELATED APPLICATION(S)

The present application claims the benefit of U.S. Provisional Application No. 61/244,869, filed Sep. 22, 2009, the disclosure of which is hereby incorporated by reference.

BACKGROUND OF THE INVENTION

Field of the Invention

The present invention relates to generally to video camera systems.

Description of the Background Art

Video camera systems are commonly used for video surveillance of prescribed areas. For example, such systems are used for surveillance of parking lots, department stores, casinos, banks, and other areas of interest.

Conventional video cameras commonly used in such systems include fixed-type and movable-type cameras. The fixed-type cameras may be configured to observe a fixed area, and the movable-type cameras may be configured with pan-and-tilt motor units to observe a wide area range.

SUMMARY

One embodiment relates to a method of outputting multiple views from a networked camera. Each imager of an array of imagers in the camera captures image frames and transmits the captured image frames to an associated image flow processor. Each image flow processor processes the captured image frames and transmits the processed image frames to a multi-imager video processor. An updating of parameters for said processing by each image flow processor is performed on a frame-by-frame basis.

Another embodiment relates to a video camera including a plurality of imagers, a plurality of image flow processors, a multi-imager video processor, and a plurality of update queues. Each imager includes a sensor array that is configured to capture image frames from light projected by one of said lenses, and each image flow processor is configured to receive and process the image frames captured from at least one said sensor array. The multi-imager video processor is configured to receive the processed image frames from the plurality of image flow processors, and each update queue is associated with an image flow processor.

Other embodiments and features are also disclosed.

BRIEF DESCRIPTION OF THE DRAWINGS

FIG. 1A shows a top schematic view showing select components of a video camera in accordance with an embodiment of the invention.

DETAILED DESCRIPTION

Figure 1B:
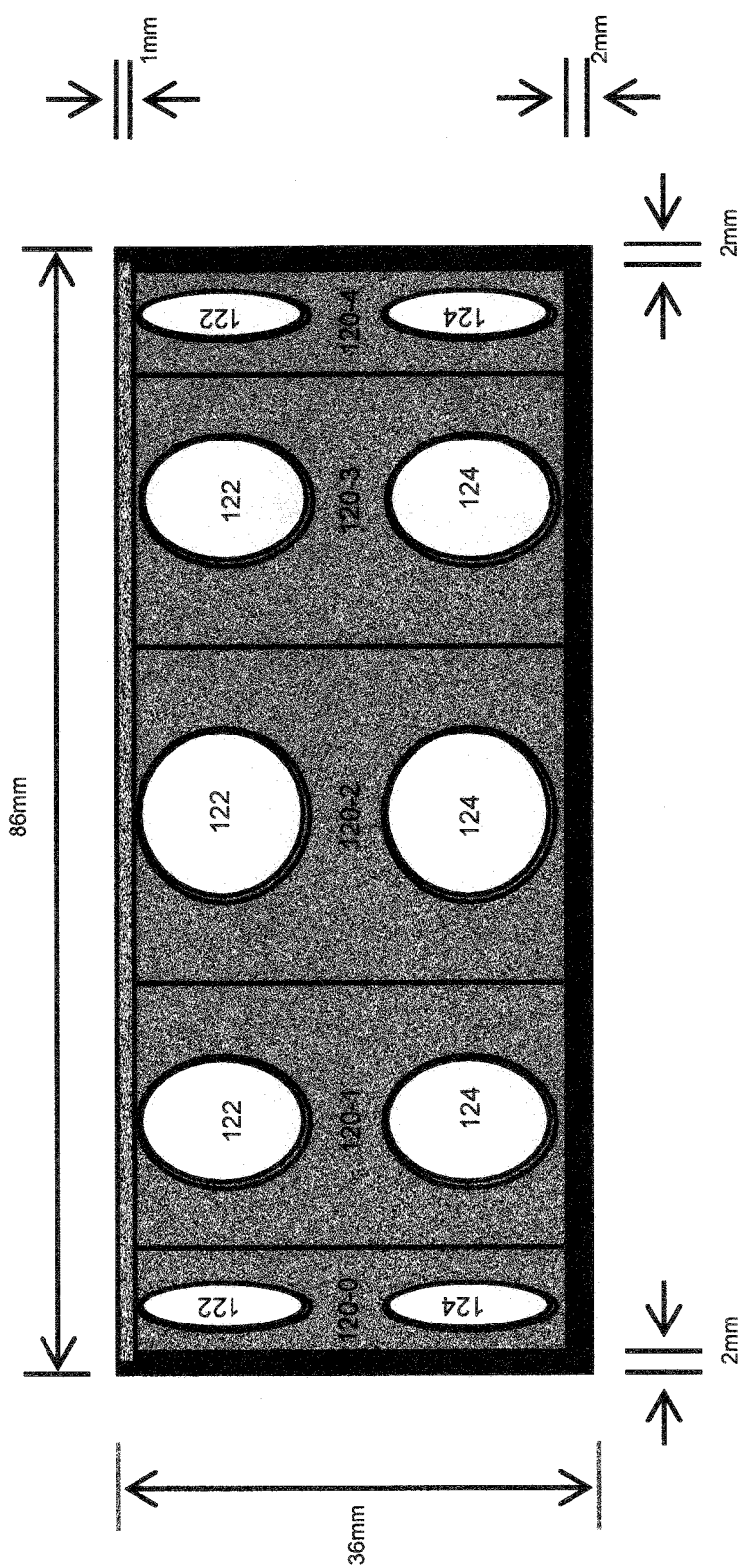
FIG. 1B shows a front perspective view of a video camera in accordance with an embodiment of the invention.

FIG. 1A shows a top schematic view showing select components of a video camera in accordance with an embodiment of the invention. The video camera includes a camera body 102, a main board 104, a multi-imager video processor 106, and five imager boards 108. The camera has a diameter D, and each imager board is of a width W. Shown in FIG. 1A are a field of view 110 for a single imager and a field of view 116 from two adjacent imagers.

Within each single-imager field of view 110, a select-angle field of view 112 may be selected. In a preferred implementation, the single-imager field of view 110 is 38 degrees wide, and the select-angle field of view 112 is 36 degrees wide.

As further shown, there is a small vertical slice 114 (approximately an inch wide, for example) which is between select-angle fields of view 112 of adjacent imagers. As seen in FIG. 1A, his small vertical slice 114 is defined by approximately parallel lines such that the width of the vertical slice 114 is approximately constant and independent of the distance away from the camera. These vertical slices between adjacent imagers are not captured within the final image generated by combining the select-angle fields of view 112 from the five imagers.

FIG. 1B shows a front perspective view of a video camera in accordance with an embodiment of the invention. As shown, the front of the camera may include five faces 120 (-0 through -4) corresponding to the five imager boards 108. In this embodiment, each imager board 108 includes two sensors 122 and 124. In a preferred embodiment, one sensor 122 may be configured to capture daylight images, while the other sensor 124 may be configured to capture nightlight (low light) images. In another embodiment, one sensor 122 may be configured to capture lower resolution images, while the other sensor 124 may be configured to capture higher resolution images.

Figure 2A:
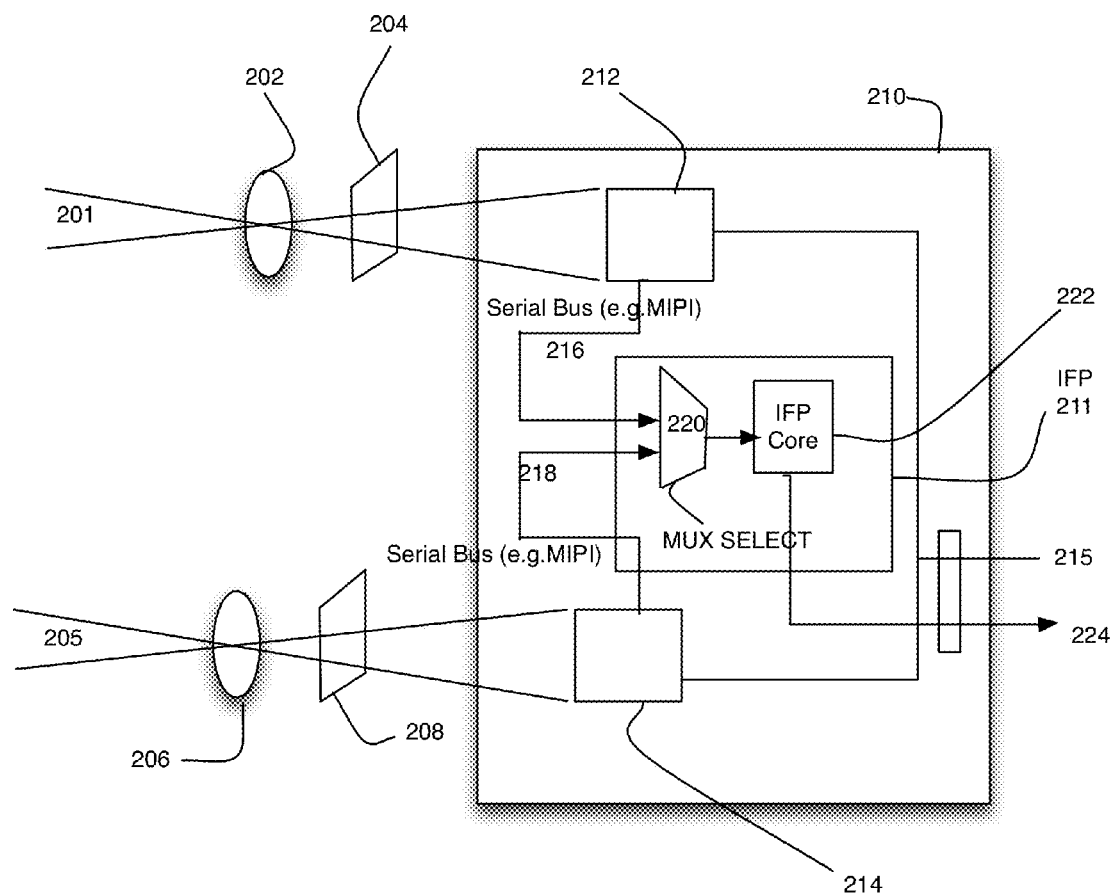
FIG. 2A is a schematic diagram of an imager board of the video camera in accordance with one embodiment of the invention.

FIG. 2A is a schematic diagram of an imager board 210 of the video camera in accordance with one embodiment of the invention. As shown, the image light 201 that is received by a first imager (image sensor) 212 is focused by a first barrel lens 202 and filtered by a first infra-red cut filter 204, and the image light 205 that is received by a second imager (image sensor) 214 is focused by a first barrel lens 206 and filtered by a first infra-red cut filter 208. For example, the first barrel lens 202 may be 12 mm or less in length and have an F# greater than 2.2, and the second barrel lens 206 may be 12 mm or less in length and have an F# less than 2.2. The first infra-red cut filter 204 may cutoff (block) infrared light in the wavelength range of 600 nm to 700 nm. The second infra-red cut filter 206 may cutoff (block) infrared light with wavelengths greater than 700 nm, or, alternatively, the second infra-red cut filter 206 may be absent.

In one embodiment, the first imager 212 may be configured as a "day" imager that is optimized for good color fidelity and sharpness, and the second imager 214 may be configured as a "night" imager that is optimized for good low-light performance. In this embodiment, the first imager may be implemented, for example, as a CMOS image sensor array with more than 1.2 million pixels and a pixel size less than 4 microns in width. The image output by the first imager 212 may have a signal-to-noise ratio of greater than 10 dB when scene lighting is greater than 200 Lux. The second imager may be implemented, for example, as a CMOS image sensor array with less than 1.2 million pixels and a pixel size greater than 3 microns in width. The image output by the second imager 214 may have a signal-to-noise ratio of greater than 10 dB when scene lighting is less than 2 Lux.

The first and second imagers 212 and 214 may be controlled by way of control signals received via a control bus 215. The control bus 215 may be implemented as an I2C bus, for example.

A first serial bus 216 may be used to communicate the output image data from the first imager 212 to a day/night multiplexer 220 on the image flow processor (IFP) 211, and a second serial bus 218 may be used to communicate the output image data from the second imager 214 to the day/night multiplexer 220 on the IFP 211. For example, the first and second serial buses may be implemented as MIPI buses.

Based on a multiplexer select (mux select) signal, the multiplexer 220 selects the image data from either the first serial bus 216 (i.e. from the first imager) or the second serial bus 218 (i.e. from the second imager). The selected image data is then received by the IFP core 222. The IFP core 222 may output image data via a serial bus (for example, an MIPI bus) 224 to a multi-imager video processor (MIVP). A connector 215 may be used to connect the control bus 215 and the serial bus 224 to the MIVP.

Figure 2B:
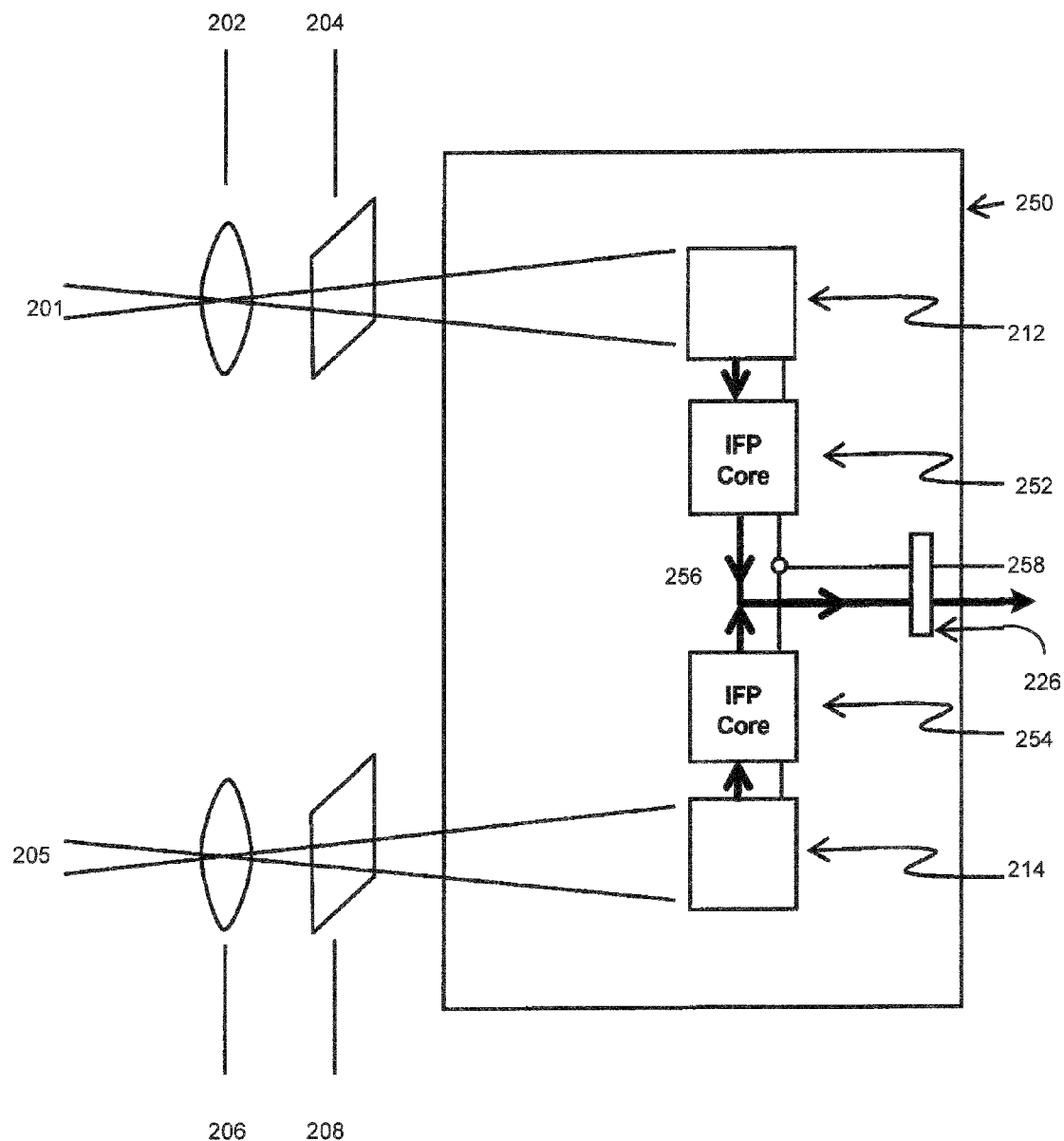
FIG. 2B is a schematic diagram of an imager board of the video camera in accordance with another embodiment of the invention.

FIG. 2B is a schematic diagram of an imager board 250 of the video camera in accordance with another embodiment of the invention. The imager board 250 of FIG. 2B differs from the imager board 210 of FIG. 2A in a few ways. First, instead of one IFP core 222, there are two IFP cores 252 and 254 which each receives data from one of the two imagers 212 and 214. These IFP cores 252 and 254 may be integrated with the integrated circuits (ICs) of their respective imagers 212 and 214, or they may be implemented as separate ICs. Second, instead of a multiplexer 220 to select the image data and a serial bus 224 to output the select image data, a shared parallel bus 256 is used to select and output the image data the MIVP. In this case, control signals from the control bus 258 ensures that only one IFP core is driving the parallel bus 256 at any one time (to avoid contention). The connector 260 may be used to connect the control bus 258 and the parallel bus 256 to the MIVP.

Figure 3:
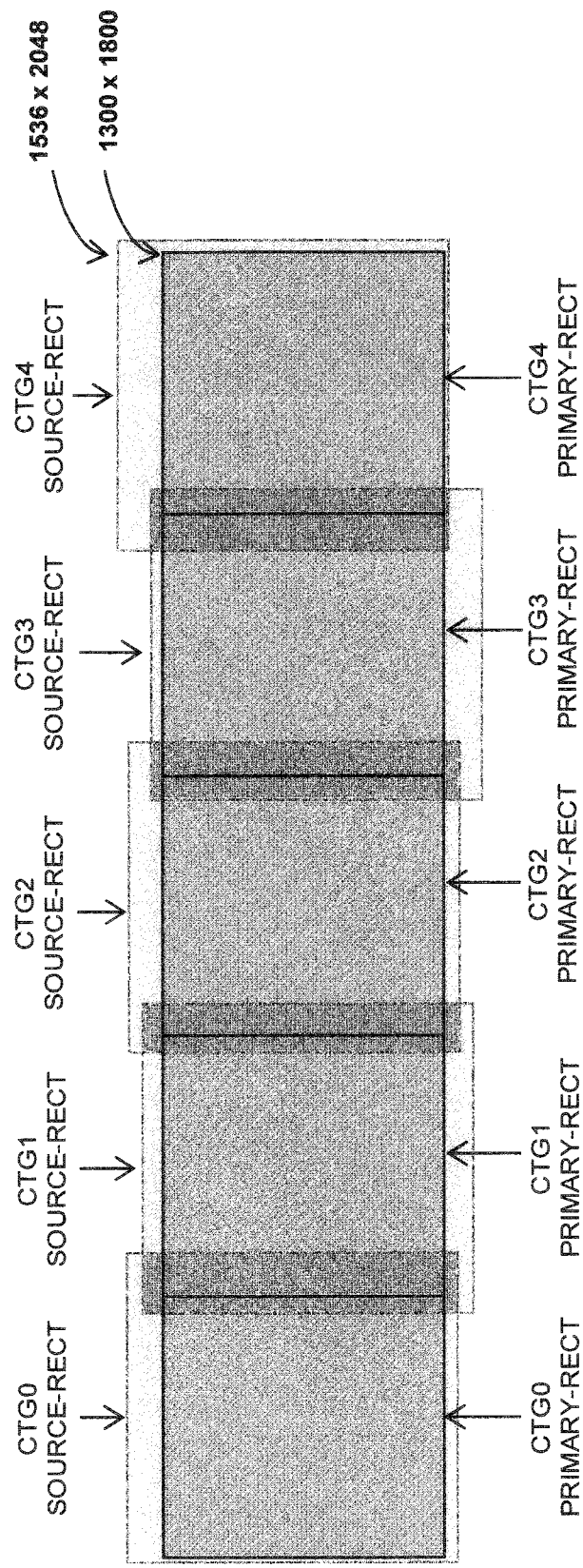
FIG. 3 is a schematic diagram depicting selection of primary image frames from source image frames for multiple sensors of a video camera in accordance with another embodiment of the invention.

FIG. 3 is a schematic diagram depicting selection of primary image frames from source image frames for multiple sensors of a video camera in accordance with another embodiment of the invention. The five source rectangles (CTG0 SOURCE-RECT, CTG1 SOURCE-RECT, CTG2 SOURCE-RECT, CTG3 SOURCE-RECT, CTG4 SOURCE-RECT and CTG5 SOURCE-RECT) are the source image data within the field of view of the five imagers of the video camera. The source rectangles (for example, each 1536×2048 pixels) are depicted as non-aligned because the imagers are expected to have mechanical imperfections. The five primary rectangles (CTG0 PRIMARY-RECT, CTG1 PRIMARY-RECT, CTG2 PRIMARY-RECT, CTG3 PRIMARY-RECT, and CTG4 PRIMARY-RECT) are selected by each IFP core "cherry picking" a smaller rectangle (for example, 1300×1800 pixels) within its field of view. For example, as discussed above in relation to FIG. 1A, while the source rectangles may obtain image data from a 38 degree wide field of view, the primary rectangles may represent the image data from a slightly narrower 36 degree field of view.

Figure 4:
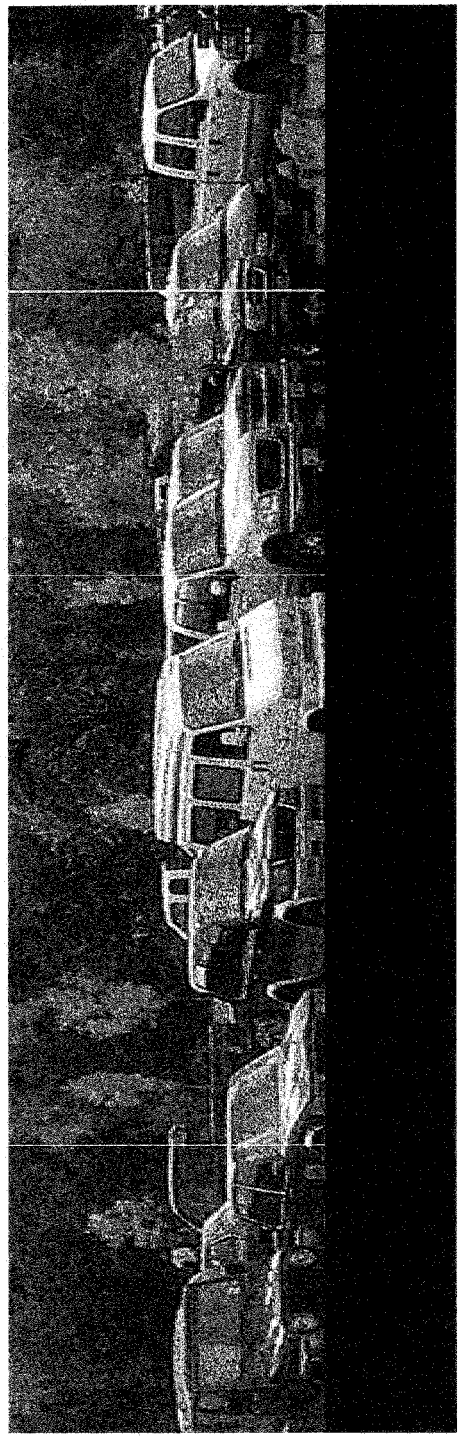
FIG. 4 is an example final image frame resulting from the primary image frames for the multiple sensors of the video camera in accordance with another embodiment of the invention.

FIG. 4 is an example final image frame resulting from the multiple sensors of the video camera in accordance with another embodiment of the invention. In this example, after cropping and resizing such that each of the five component image frames is 384×1080 pixels, the final image frame may be 1920×1080 pixels, as shown in FIG. 4. Note that no digital stitching is required to obtain this final image.

Figure 5:
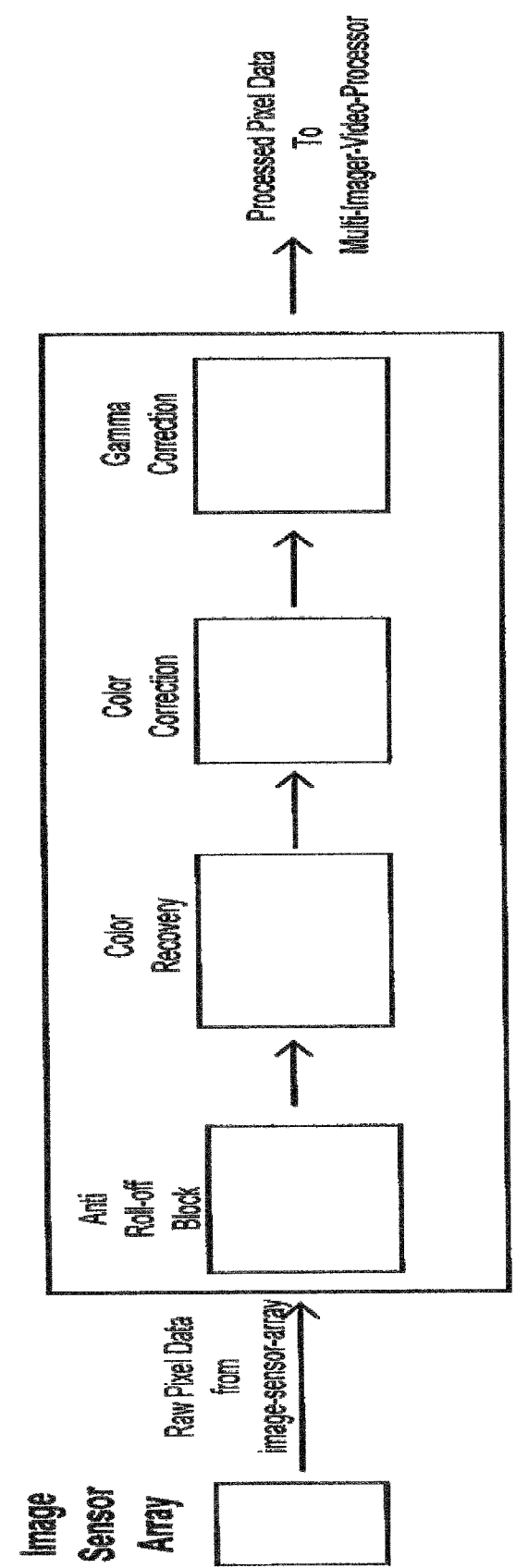
FIG. 5 is a schematic diagram showing pixel processing components of an image flow processor in accordance with another embodiment of the invention.

FIG. 5 is a schematic diagram showing pixel processing components of an image flow processor (IFP) in accordance with another embodiment of the invention. As shown, the image sensor array (imager) output raw pixel data to the IFP core. The IFP core includes, among other components, an anti-roll-off block, a color recovery block, a color correction block, and a gamma correction block. These blocks process the pixel data. The processed pixel data is then transmitted to the multi-imager video processor.

Figure 6:
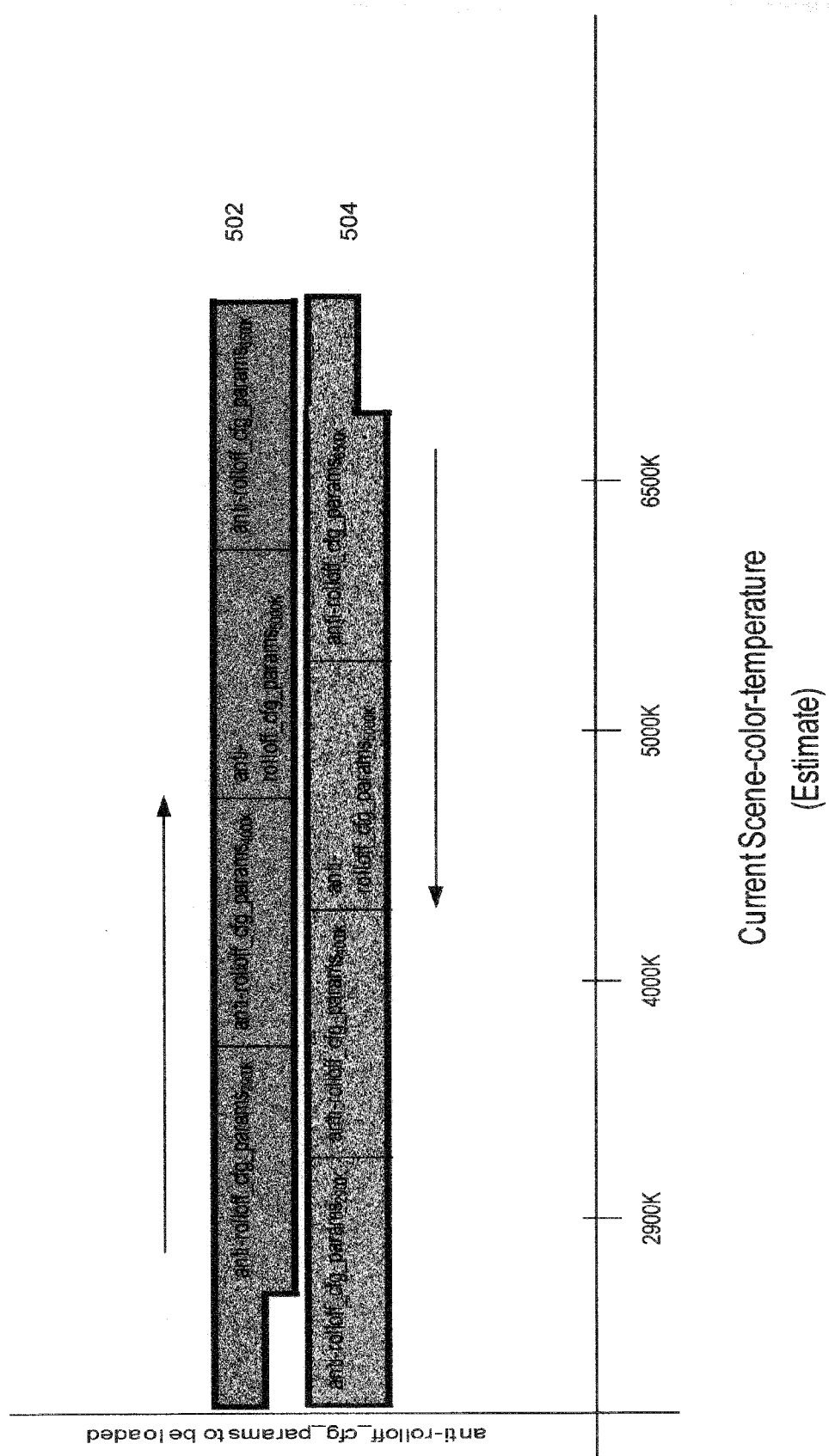
FIG. 6 is a diagram showing two sets of color temperature ranges for the application of anti-rolloff configuration parameters in accordance with another embodiment of the invention.

FIG. 6 is a diagram showing two sets of color (blackbody) temperature ranges for the application of anti-rolloff configuration parameters in accordance with another embodiment of the invention. Each set includes four color temperature ranges for the application of different anti-rolloff configuration parameters. The four color temperature ranges in each set are labeled 2900K, 4000K, 5000K, and 6500K. The first set of color temperature ranges 502 are shifted in temperature compared with the second set of color temperature ranges 504. A transition to a higher range (for example, from the 2900K range to the 4000K range) occurs according to the first set of ranges 502, while a transition to a lower range (for example, from the 4000K range to the 2900 K range) occurs according to the second set of ranges. This provides an advantageous hysteresis effect in the application of the anti-rolloff configuration parameters.

Figure 7:
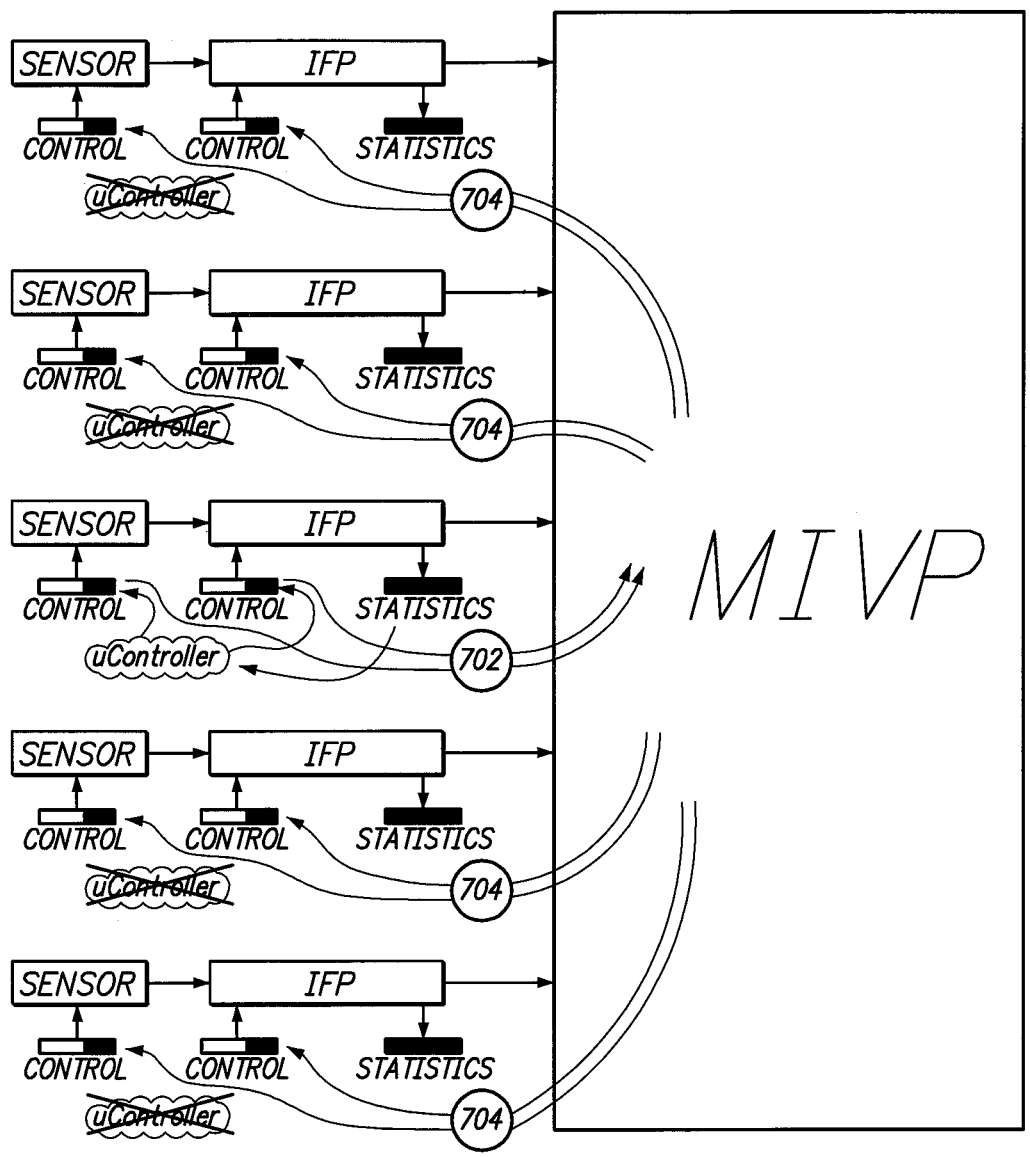
FIG. 7 is a schematic diagram illustrating a technique for auto-exposure-control and auto-white-balance for multiple sensors of a video camera in accordance with another embodiment of the invention.

FIG. 7 is a schematic diagram illustrating a technique for auto-exposure-control (AEC) and auto-white-balance (AWB) for multiple sensors of a video camera in accordance with another embodiment of the invention. The AEC and AWB for each sensor is controlled by a control blocks for the sensor and associated IFP and uses a statistics block to analyze data from the associated IFP.

As shown, the video camera is configured such that the AEC and AWB is turned on at the microcontroller (μcontroller) for only one of the five imagers, and turned off at the microcontroller for the other four imagers. In a preferred embodiment, the AEC and AWB is turned on only at the microcontroller for the middle imager of the array of imagers (for example, the imager being used, either day 122 or night 124, of face 120-2 in FIG. 1B). By disabling the AEC and AWB controls on all but one of the imagers, the AEC and AWB updates from the single AEC/AWB-enabled imager may be transmitted 702 to the MIVP. The MIVP may then clone (copy) the AEC and AWB updates and send 704 them to the other imagers. This configuration is very low cost and efficient to implement and advantageously provides AEC and AWB across all the five imagers in a synchronized manner.

Figure 8:
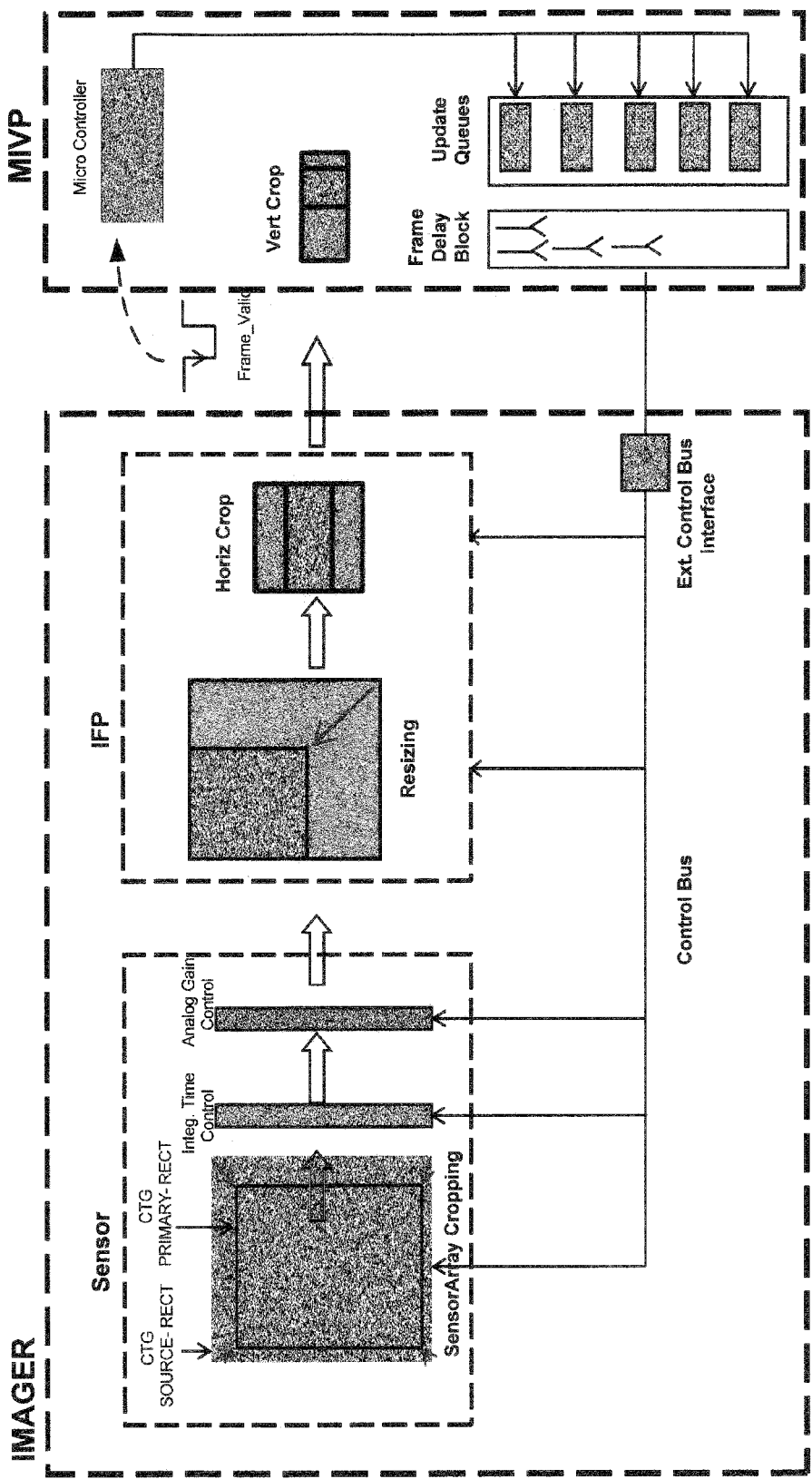
FIG. 8 is a schematic diagram illustrating a technique for enabling frame-by-frame view switching in accordance with another embodiment of the invention.

FIG. 8 is a schematic diagram illustrating a technique for enabling frame-by-frame view switching in accordance with another embodiment of the invention. Shown in this figure is one imager of the multiple imagers in the camera.

As shown, the sensor array of each imager performs cropping from the source rectangular frame (CTG SOURCE-RECT) to the primary rectangular frame (CTG PRIMARY-RECT). In addition, circuitry may be included in the sensor IC for integration time control and analog gain control. The integration time control is used to provide exposure control, while the analog gain control is used to provide white balance control.

Figure 9:
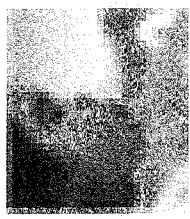
FIG. 9 illustrates re-sizing of an image frame in accordance with an embodiment of the invention.
Figure 9:
Figure 9:
Figure 10A:
FIG. 10A illustrates horizontal cropping of an image frame in accordance with an embodiment of the invention.
Figure 10A:
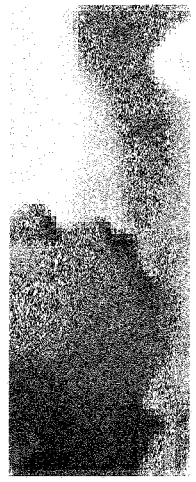

As further shown, the IFP for each imager may include resizing and cropping circuitry. The IFP may be incorporated onto the same integrated circuit as the sensor array, or the IFP may be implemented on a separate integrated circuit. In one embodiment, the IFP first resizes the image in the primary rectangular frame, and then performs a "horizontal" cropping of the resized image. In an alternative embodiment, the horizontal cropping may be performed in the sensor by appropriate adjustment of the primary rectangular frame so as to implement the desired horizontal crop. An example of a resizing of an image is shown in FIG. 9. The horizontal cropping reduces a number of pixels in a vertical dimension of the image. An example of a horizontal cropping of an image is shown in FIG. 10A.

Figure 10B:
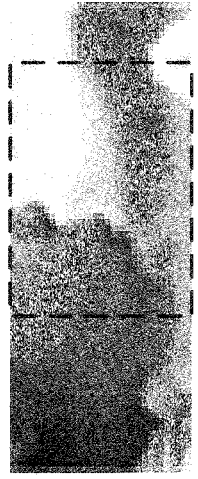
FIG. 10B illustrates vertical cropping which may be applied after horizontal cropping in accordance with an embodiment of the invention.
Figure 10B:
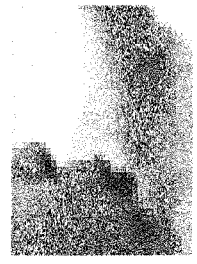

The MIVP receives the horizontally-cropped resized images from the multiple imagers to obtain a combined image. The MIVP may then perform a "vertical" cropping of the combined image to create a final image frame. The vertical cropping reduces a number of pixels in a horizontal dimension of the image. An example of a vertical cropping of an image is shown in FIG. 10B. The technique of performing the horizontal cropping in the IFP (or sensor circuitry) and vertical cropping in the MIVP is advantageously efficient and reduces the amount of image data that is needed to be received and processed by the MIVP.

As further shown in FIG. 8, there may be a plurality of update queues, one for each imager. Each update queue may be configured to hold parameters to be sent on a frame-by-frame basis to the corresponding imager. The parameters may include, for example, the resizing and horizontal cropping parameters for a frame. The parameters may also include integration time control and analog gain control parameters to be applied by certain sensors as described above in relation to FIG. 7. In one implementation, a falling edge of a Frame_Valid signal from an imager may cause an interrupt signal to be sent to a microcontroller within the MIVP. The microcontroller may then cause the parameters at the top of the corresponding queue to be released to be applied to the next frame by that imager.

The above-described capability to switch views (i.e. to re-size and crop) on a frame-by-frame basis may be advantageously applied to enable the camera to simultaneously provide different views to multiple users.

Figure 11:
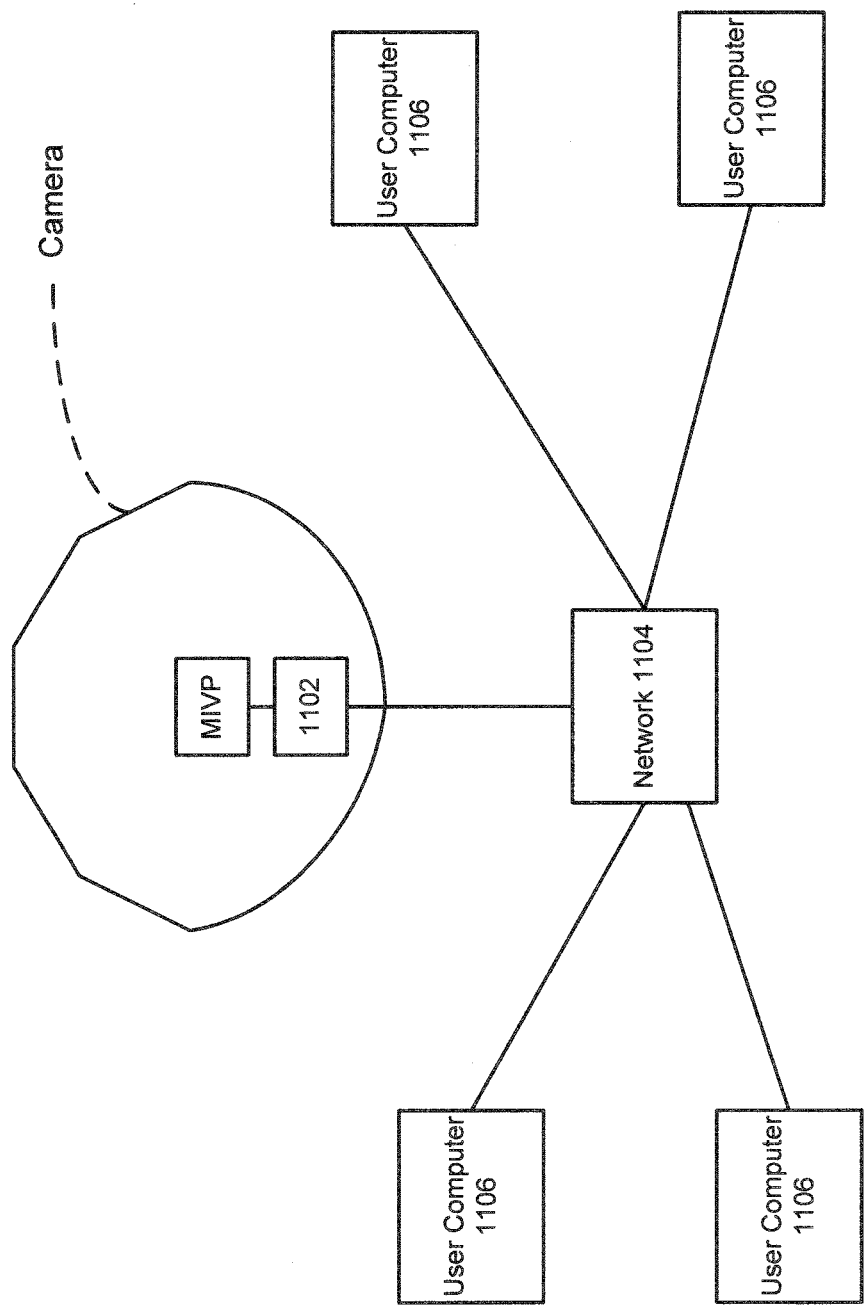
FIG. 11 is a schematic diagram illustrating the video camera disclosed herein as interconnected to a plurality of user computers via a network in accordance with an embodiment of the invention.

FIG. 11 is a schematic diagram illustrating the video camera disclosed herein as interconnected to a plurality of user computers 1106 via a network 1104 in accordance with an embodiment of the invention. As shown, the video camera includes a network processor (or packetizer) 1102. While the embodiment shown in FIG. 11 has a network processor 1102 as a separate processor that is interconnected with the MIVP, another embodiment may have the network processor 1102 as part of the MIVP.

The MIVP may be configured to encrypt and compress the final image frames to generate encoded image frames. The network processor 1102 may be configured to receive the encoded image frames generated by the MIVP and to generate data packets therefrom which are addressed to a plurality of user computers. The data packets addressed to a particular user computer contain the encoded image frames which are customized for that user computer.

For example, consider that the above-discussed camera is networked to a network which includes three user computers: User A; User B; and User C. Further consider that each user computer may select a different view for display by way of a user interface on the user computer. For example, the user interface may allow the user to crop and re-size the image to be viewed. In this particular example, consider that the camera obtains image data at 60 frames per second, and that the priorities between the users is such that User A is to receive video at 30 frames per second, User B is to receive video at 10 frames per second, and User C is to receive video at 20 frames per second. The Update Queues in FIG. 8 may each contain the following sequence of parameters, where A indicates parameters for the view requested by User A, B indicates parameters for the view requested by User B and C indicates parameters for the view requested by User C).

CACBCACACBCACACBCACACBCA . . .

For frames taken with parameters A, the network processor may packetize those frames with the network address of User A and transmit those packets to User A via the network. For frames taken with parameters B, the network processor may packetize those frames with the network address of User B and transmit those packets to User B via the network. For frames taken with parameters C, the network processor may packetize those frames with the network address of User C and transmit those packets to User C via the network.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A video camera apparatus comprising:
   a plurality of imagers, each imager comprising a sensor array that is configured to capture image frames;
   a plurality of image flow processors, each image flow processor being configured to receive and process the image frames captured from at least one said sensor array; and
   a multi-imager video processor configured to receive the processed image frames from the plurality of image flow processors; and
   a plurality of update queues, each update queue being associated with an image flow processor;
   wherein each update queue comprises a sequence of parameters corresponding to a plurality of views,
   each requested by a different user; wherein said sequence of parameters causes each imager to switch views on a frame-by-frame basis resulting in the capture of simultaneous different views, each corresponding to a different user.

2. The apparatus of claim 1, wherein an entry in an update queue provides parameters to be applied by the associated image flow processor and/or an imager to process a single image frame.

3. The apparatus of claim 2, wherein the parameters include cropping parameters.

4. The apparatus of claim 3, wherein the parameters include cropping parameters which provide information to perform a horizontal cropping of single image frame.

5. The apparatus of claim 4, wherein the multi-imager video processor is further configured to apply a vertical cropping of the single image frame.

6. The apparatus of claim 2, wherein the parameters include re-sizing parameters which provide information to perform re-sizing of the single image frame.

7. The apparatus of claim 1, wherein the imagers are arranged in a plurality of groups, and wherein the image flow processors are configured to receive the image frames from one said group at a time.

8. The apparatus of claim 7, wherein the imagers in a first group are optimized for daylight viewing conditions, and the imagers in a second group are optimized for nightlight viewing conditions.

9. The apparatus of claim 7, wherein the imagers in a first group are configured for lower resolution viewing, and the imagers in a second group are configured for higher resolution viewing.

10. The apparatus of claim 1, wherein the imagers in a first group are configured to have a combined field of view of 180 degrees, the imagers in a second group are configured to have a combined field of view of 180 degrees, and wherein the imagers in the first group are arranged above the imagers in the second group.

11. The apparatus of claim 1, further comprising:
    a plurality of barrel lenses, each barrel lens configured to receive and focus light onto the sensor array of an associated imager.

* * * * *